United States Patent
Mauderer

(10) Patent No.: US 9,945,944 B2
(45) Date of Patent: Apr. 17, 2018

(54) BLIND AREA WARNING FOR VEHICLES

(75) Inventor: Hans-Peter Mauderer, Gaggenau (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1316 days.

(21) Appl. No.: 13/370,718

(22) Filed: Feb. 10, 2012

(65) Prior Publication Data

US 2012/0206275 A1 Aug. 16, 2012

(30) Foreign Application Priority Data

Feb. 10, 2011 (EP) .................................... 11154020

(51) Int. Cl.
G08G 1/0965 (2006.01)
G01S 13/93 (2006.01)

(52) U.S. Cl.
CPC .................................. G01S 13/931 (2013.01)

(58) Field of Classification Search
CPC ... B60Q 9/006; B60Q 9/008; B60W 30/0956; B60W 2510/1005; B60W 2520/06; G01S 13/931; G01S 2013/9317; G01S 2013/9332; G01S 2013/9353; G01S 2013/9378; G01S 13/66; G01S 2013/9375; G01S 2013/9385
USPC ....... 340/901, 432, 435, 436, 438, 456, 903; 180/170
See application file for complete search history.

(56) References Cited

U.S. PATENT DOCUMENTS

| 4,349,823 | A | * | 9/1982 | Tagami et al. ................... 342/70 |
| 5,712,640 | A | * | 1/1998 | Andou et al. ................... 342/70 |
| 6,784,828 | B2 | * | 8/2004 | Delcheccolo ...... B60K 31/0008 340/436 |
| 7,920,969 | B2 | * | 4/2011 | Mudalige et al. ............ 701/301 |
| 2004/0239490 | A1 | | 12/2004 | Chiba et al. |
| 2009/0045928 | A1 | | 2/2009 | Rao et al. |
| 2012/0154591 | A1 | * | 6/2012 | Baur ......................... B60R 1/00 348/148 |

FOREIGN PATENT DOCUMENTS

JP 2009301400 12/2009

* cited by examiner

Primary Examiner — Steven Lim
Assistant Examiner — Mancil Littlejohn, Jr.
(74) Attorney, Agent, or Firm — McCoy Russell LLP

(57) ABSTRACT

Methods and devices are disclosed for assisting a driver of a first vehicle where a second vehicle is detected by a sensor of the first vehicle and a driver of the first vehicle is informed that the second vehicle is at the side of the first vehicle when the second vehicle leaves an area monitored by the sensor, the area monitored by the sensor being an area behind the first vehicle.

13 Claims, 5 Drawing Sheets

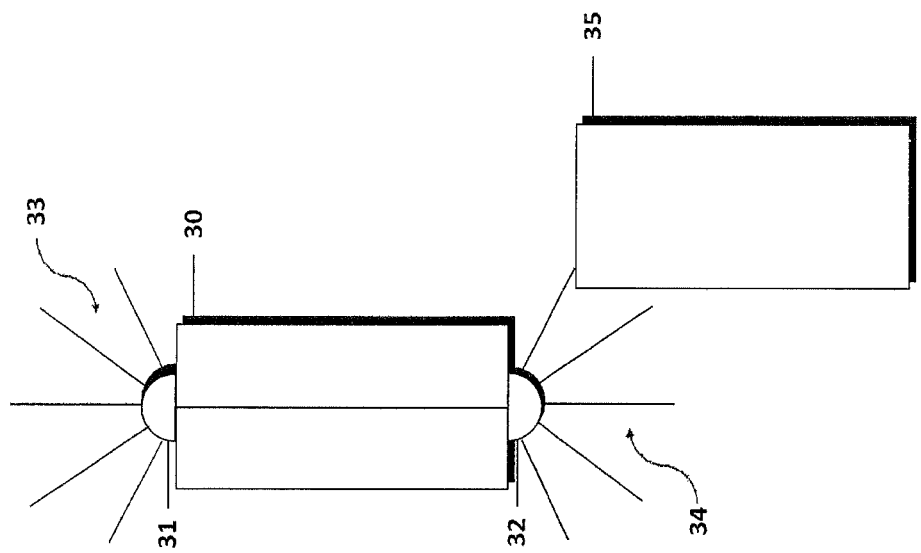

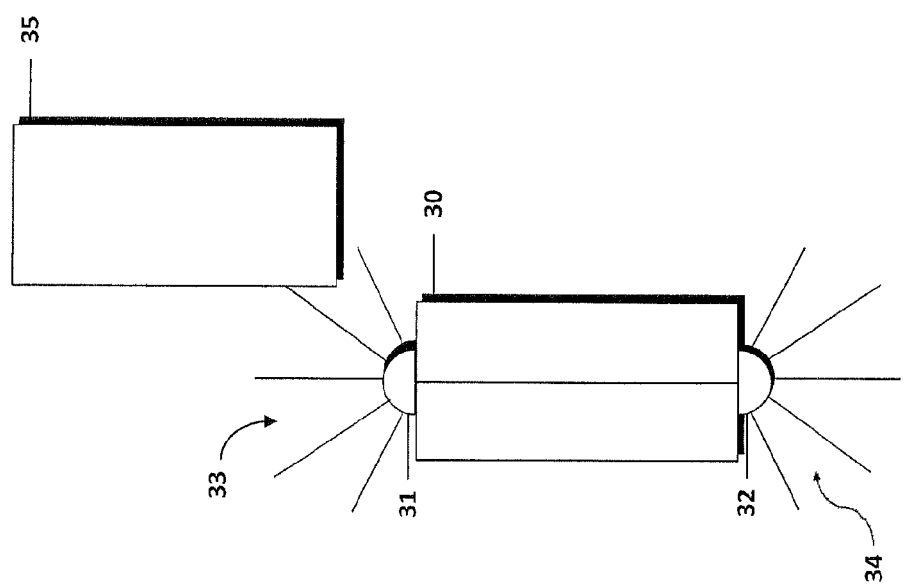

BLIND AREA WARNING FOR VEHICLES

1. CLAIM OF PRIORITY

This patent application claims priority from EP Application No. 11 154 020.9 filed Feb. 10, 2011, which is hereby incorporated by reference.

2. FIELD OF TECHNOLOGY

This application relates to methods and devices for assisting a driver of a motor vehicle in detecting other vehicles alongside the vehicle, in particular in a blind spot area of the vehicle.

3. RELATED ART

Motor vehicles, for example cars, equipped with conventional side mirrors and a rear mirror have so-called blind areas or blind spots on the sides of the vehicles. Other vehicles in these blind areas cannot be seen by a driver looking straight ahead (as normal for driving), nor can they be seen in the rear mirror or in the side mirrors. This may lead to dangerous situations or even accidents when a driver of the vehicle is not aware of the vehicle in the blind area and attempts to make maneuvers like lane changes, overtaking maneuvers, turning left or right or the like.

In some modern vehicles dedicated sensors such as cameras are provided to monitor the side areas of a vehicle and to warn a driver when another vehicle is within the vehicle blind spot. Additional sensors such as cameras are often present to monitor front and rear areas of the vehicle, for example to provide parking assistance, automatic cruise control or other types of assisted driving. However, such dedicated sensors for monitoring the blind spots increase the vehicle cost. There is a need for cost-efficient methods and devices for warning a driver when other vehicles are located in the vehicle blind spot.

SUMMARY OF THE INVENTION

A method for assisting a driver of a first vehicle includes detecting a second vehicle with a rear sensor of the first vehicle, the sensor of the first vehicle monitoring an area located behind the first vehicle, and informing the driver of the first vehicle that the second vehicle is at a side of the first vehicle when the second vehicle leaves the area monitored by the rear sensor.

With such a method, no dedicated sensor monitoring the side areas, in particular the blind areas, of the vehicle is needed.

Informing the user may comprise issuing an audible signal to the user and/or issuing a visible signal to the user.

The method may also comprise informing the user that the second vehicle is not besides the first vehicle any longer when the second vehicle is detected by a front sensor of the first vehicle, the front sensor monitoring an area in front of the first vehicle.

The rear sensor and/or the front sensor may be image sensors, and the identity of a second vehicle leaving the area monitored by the rear sensor and the second vehicle entering the area monitored by the front sensor may be ascertained using image processing.

In some embodiments, the informing of the user may be performed only when the leaving of the second vehicle of the area monitored by the rear sensor does not indicate a leaving in a direction other than a direction toward a side of the first vehicle (e.g., the second vehicle is in a lane adjacent to the first vehicle and the second vehicle has not turned in a direction different than the travel direction of the first vehicle).

In some embodiments, the user may be informed that the second vehicle is no longer at the side of the first vehicle when a predetermined time after the informing of the user that the second vehicle is in a side area of the first vehicle has elapsed.

In another embodiment, a device for a first vehicle comprises a rear sensor configured to monitor an area behind the first vehicle, and a control unit coupled to the rear sensor, wherein the control unit is configured to control an output device to output information to a driver of the first vehicle that a second vehicle is at a side of the first vehicle when the second vehicle detected by the rear sensor leaves the area monitored by the rear sensor.

With such a device, a warning regarding a vehicle at the side of the first vehicle, for example in the blind spot thereof, may be provided without a dedicated sensor monitoring the side of the vehicle.

The device may also comprise a further sensor (e.g., a rear sensor) configured to monitor an area in front of the first vehicle, and the control unit may also be configured to control the information outputting unit to inform the driver of the first vehicle that the second vehicle is not at the side of a first vehicle any longer when the second vehicle is detected by the rear sensor.

The front sensor and/or the rear sensor may be image sensors like cameras.

The device, for example the control unit thereof, may be configured, for example the control be programmed, to perform the method of any of the above-described embodiments.

Furthermore, a vehicle comprising such a device is provided.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

Embodiments of the invention will be described with reference to the accompanying drawings.

FIGS. 3A-3C show different driving situations to further illustrate some features of the blind spot warning device and method.

DETAILED DESCRIPTION OF THE INVENTION

Embodiments of the invention will be described with reference to the drawings. It should be noted that features of different embodiments described herein may be combined with each other unless specifically stated otherwise. On the other hand, describing an embodiment with a plurality of features is not to be construed as indicating that all the features are necessary for practicing the present invention, as other embodiments may comprise less features and/or alternative features.

Figure 1:
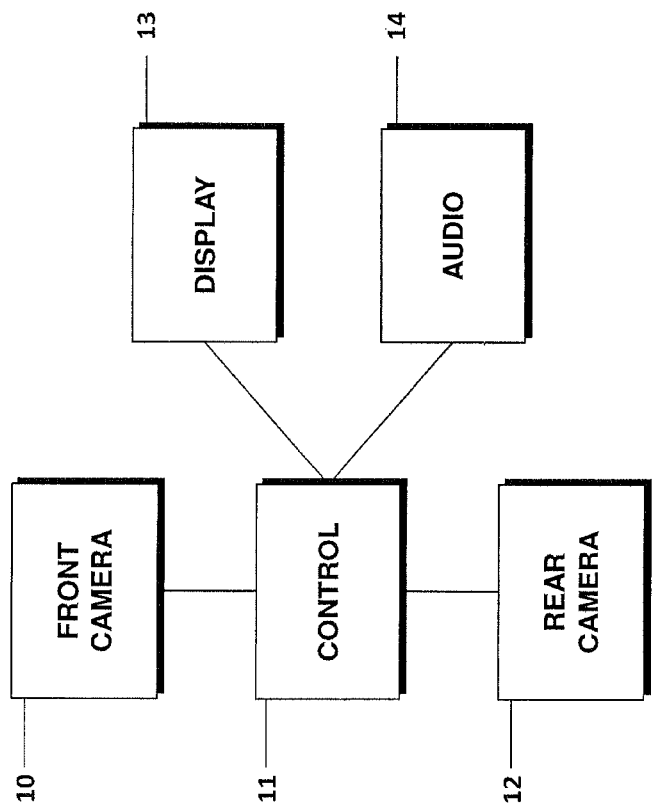
FIG. 1 is a schematic block diagram illustration of a blind spot warning device according to an embodiment.

In FIG. 1, a block diagram illustration of an embodiment of a device for assisting a driver of a vehicle. The device comprises a front camera 10 that monitors an area in front of the vehicle, a rear camera 12 that monitors an area behind the vehicle, and a control unit 11 coupled to the front camera 10 and to the rear camera 12 to evaluate the signals therefrom. The control unit 11 may be a dedicated controller for operating the device described in the following or may be a general purpose control unit, such as for example a microprocessor with associated memories and corresponding programming, which may also be used for other purposes, for example for controlling other functions, within the vehicle. Instead of the front camera 10 and the rear camera 12, other types of sensors, such as for example infrared sensors or radar sensors, may be additionally or alternatively used in some embodiments. In some embodiments, only the rear camera 12 or another sensor monitoring an area behind the vehicle may be provided.

The control unit 11 is coupled with a display 13 and an audio output 14 (e.g., a loudspeaker) to output information to the driver of the vehicle. In other embodiments, only a display or only an audio output device may be used, or some other enunciator for outputting information to a driver, such as for example light emitters like LEDs, may be used.

The vehicle equipped with the device shown in FIG. 1 or a similar device according to another embodiment in the following will also be referred to as an "equipped vehicle".

Besides warning a driver of the equipped vehicle of other vehicles at the side of the equipped vehicle (e.g., in a blind area of the equipped vehicle), which will be described later in more detail, the front camera 10 and/or the rear camera 12 may also be used for other purposes. For example, the front camera 10 may be used in the context of a vehicle control that automatically keeps a constant distance to a vehicle in front of the equipped vehicle, and the rear camera 12 may be used for purposes such as parking assist.

Figure 2:
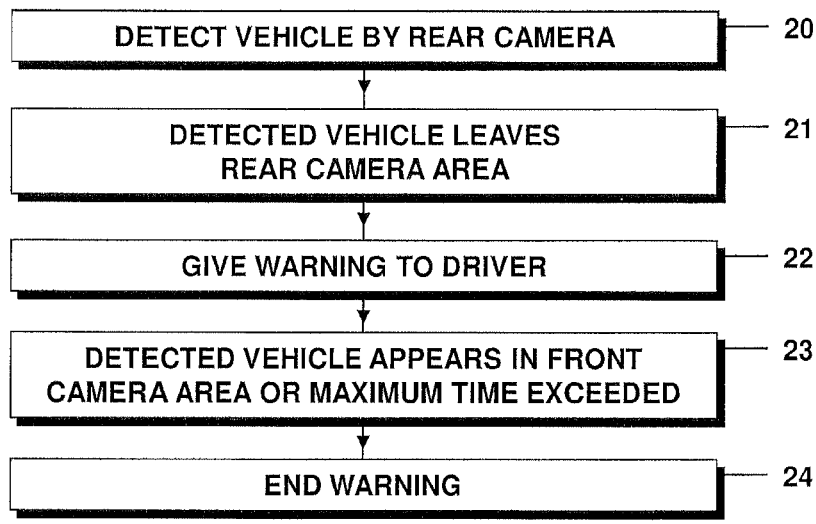
FIG. 2 shows a flowchart illustrating an embodiment of a method of blind spot warning.

As indicated above, the device shown in FIG. 1 may be used for warning a driver of the equipped vehicle of other vehicles being at the side of the equipped vehicle, in particular in a blind area, without needing a dedicated sensor (e.g., a dedicated camera), for monitoring the side of the equipped vehicle. Embodiments of corresponding mechanisms will now be explained with reference to FIGS. 2 and 3. FIG. 2 shows a flowchart of a method which may be implemented in the device of FIG. 1, but also may be implemented independently therefrom, and FIGS. 3A-3C show some traffic situations for illustrating certain acts or steps of the method of FIG. 2.

Figure 3B:
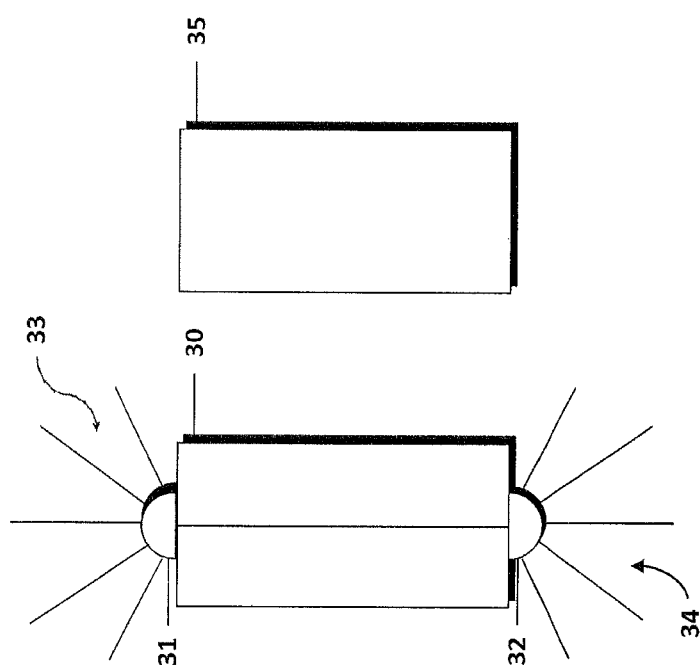

Referring to FIGS. 1-2 and 3A-3C, in step 20 (FIG. 2), a vehicle is detected by a rear camera or other sensor monitoring an area behind the equipped vehicle, for example by the rear camera 12 of the embodiment of FIG. 1. This is schematically shown in FIG. 3A, where an equipped vehicle 30 is equipped with a front camera 31 and a rear camera 32. Rays indicate a front area 33 monitored by the front camera 31 and a rear area 34 monitored by the rear camera 32, respectively. A vehicle 35 is detected in the rear area 34 monitored by the rear camera 32.

In step 21, the detected vehicle leaves the area monitored by the rear camera. In this case, at step 22 a warning is given to the driver that a vehicle (potentially) is at the side of the equipped vehicle, for example in the blind area thereof. This situation is schematically shown in FIG. 3B, where the vehicle 35 is at the side of the equipped vehicle 30 and therefore cannot be detected by the front camera 31 or the rear camera 32.

In some embodiments, when the vehicle leaves the rear camera area at the step 21, a picture analysis of images taken by the rear camera or an analysis of other information provided by a sensor other than a rear camera, for example a distance sensor, may be performed. The picture analysis by the control unit ascertains if the detected vehicle left the area monitored by the rear camera towards a side of the vehicle, and only in this case a warning is given to the driver at the step 22. For example, if the image analysis or signals provided by a distance sensor indicate that the detected vehicle left the area monitored by the rear camera due to an increasing distance, which may be caused by the equipped vehicle driving faster than the detected vehicle, no warning is given to the driver.

The warning may be given using visible information, for example information on the display 13 (FIG. 1) or by using light emitters provided in the equipped vehicle, and/or by using audible information, for example a warning sound or a text message, for example via the audio output device 14 of FIG. 1.

In step 23 (FIG. 2), the detected vehicle appears in an area monitored by a front camera of the equipped vehicle 30. This situation is shown in FIG. 3C, where the vehicle 35 enters the area 33 monitored by the front camera 31. Using image analysis of the images taken by the front camera (or, in case other sensor are used, by evaluating the data from the respective other sensor), it may be ascertained that the vehicle appearing in the area monitored by the front camera at the step 23 is the same vehicle that left the area monitored by the rear camera at step 21. For example, it can be checked whether the vehicle has the same geometry, relative speed, uses the same lane, has the same color, and/or has the same number plate.

Additionally or alternatively, the time between a vehicle leaving the area monitored by the rear camera at the step 21 and a vehicle appearing in the area monitored by the front camera at the step 23 may be taken to evaluate whether the vehicle is the same. For example, the relative speed of the vehicle (e.g., measured by the rear camera or another rear sensor) may be taken as approximately constant, and a total length for an overtaking maneuver may be estimated to be the length of the equipped vehicle plus a constant, for example a constant between about 10 and 15 meters, for example about 12.5 meters. Dividing this distance by the relative speed between the vehicle, an estimated time for the overtaking maneuver may be calculated, and the vehicle may be taken to be the same when the time between the vehicle leaving the rear camera area and the vehicle appearing in the front camera area does not deviate from this time by more than a predetermined amount, for example by about 10%, 20% or 30%.

Additionally or alternative, at the step 23 (FIG. 2) it may be checked if a maximum time is exceeded. The maximum time may be a predetermined time or may be calculated based on the above-mentioned estimated time for an overtaking maneuver, for example the estimated time plus a certain amount, for example plus about 50%.

At the step 24, after the vehicle appears in the area monitored by the front camera or the maximum time is exceeded at the step 23, the warning is ended.

It should be noted that in other embodiments only some of the actions and operations described with respect to FIG. 2 may be implemented. For example, in embodiments that have only a rear camera or other rear sensor, the detection when the vehicle appears in an area monitored by a front camera at the step 23 may be omitted. However, still a maximum time may be predetermined or be calculated based on a relative speed detected by the rear camera 12 or another rear sensor.

Although the present invention has been illustrated and described with respect to several preferred embodiments thereof, various changes, omissions and additions to the form and detail thereof, may be made therein, without departing from the spirit and scope of the invention.

What is claimed is:

1. A method for assisting a driver of a first vehicle, comprising:
    detecting a second vehicle located in a rear behind the first vehicle with a first sensor of the first vehicle, wherein the first sensor monitors a rear area behind the first vehicle; and then
    annunciating to the driver of the first vehicle that the detected second vehicle is at a side of the first vehicle in response to detecting that the detected second vehicle has departed the monitored area monitored by the first sensor in the absence of the first vehicle comprising a side facing proximity sensor, where the second vehicle cannot be detected by the first sensor after the detected second vehicle has departed the monitored area monitored by the first sensor and when the second vehicle is at the side of the first vehicle.

2. The method of claim 1, further comprising
    evaluating if the second vehicle leaves the area monitored by the first sensor in a direction towards the side of the first vehicle, and informing the driver that the second vehicle is at the side of the first vehicle only if the second vehicle leaves the rear area monitored by the first sensor in the direction of the side of the first vehicle.

3. The method of claim 1, further comprising:
    detecting that the detected second vehicle enters a front area monitored by a second sensor, the front area being in front of the first vehicle; and
    annunciating to the driver that the detected second vehicle is no longer at the side of the first vehicle when the second vehicle enters the front area.

4. The method of claim 3, further comprising:
    processing data from the first and second sensors to determine if the second vehicle that departed the rear area is the same vehicle as a vehicle entering the front area.

5. The method of claim 4, wherein the step of processing is performed based on one or more criteria selected from the group consisting of a relative speed of the second vehicle, a lane used by the second vehicle, a distance between the second vehicle and the first vehicle, a time between the second vehicle leaving the rear area and the vehicle entering the front area, a shape of the second vehicle and a number plate of the second vehicle.

6. The method of claim 2, further comprising informing the driver that the second vehicle is not at the side of the first vehicle any longer when a predetermined time has passed since the second vehicle left the rear area.

7. The method of claim 6, wherein the predetermined time is calculated based on a speed of the second vehicle.

8. The method of claim 2, wherein said annunciating to the driver that the second vehicle is at the side of the first vehicle comprises outputting a perceptible warning to the driver, and the method including informing the driver that the second vehicle is no longer at the side of the first vehicle including stopping the outputting of said perceptible warning.

9. The method of claim 8, wherein said annunciating to the driver comprises at least one of outputting visible information and outputting audible information.

10. A device, comprising:
    a first sensor configured to monitor a rear area behind a first vehicle; and
    a control unit coupled to the first sensor, the control unit being configured to control an output device to annunciate to a driver of the first vehicle that a second vehicle is at a lateral side of the first vehicle responsive to,
        detecting that the second vehicle is located in a rear area behind the first vehicle by the first sensor in the monitored area monitored by the first sensor, and then detecting that the detected second vehicle has left the monitored area monitored by the first sensor when the first sensor detects the second vehicle leaving the rear area in the absence of the first vehicle comprising a side facing vehicle proximity sensor, where the detected second vehicle cannot be detected by the first sensor after the detected second vehicle has left the monitored area monitored by the first sensor and when the detected second vehicle is at the side of the first vehicle.

11. The device of claim 10, further comprising a second sensor configured to monitor a front area in front of the first vehicle, wherein said control unit controls said output device to annunciate to the driver of the first vehicle that the second vehicle is no longer at the lateral side of the first vehicle when the second vehicle enters the front area.

12. The device of claim 11, wherein said output device comprises at least one of a display and an audio output device.

13. A device, comprising:
    a first sensor configured to monitor a rear area behind a first vehicle; and
    a control unit coupled to the first sensor, the control unit being configured to control an output device to annunciate to a driver of the first vehicle that a second vehicle is at a lateral side of the first vehicle responsive to,
        detecting that the second vehicle is located in a rear area behind the first vehicle by the first sensor in the monitored area monitored by the first sensor, and then detecting that the detected second vehicle has left the monitored area monitored by the first sensor when the first sensor detects the second vehicle leaving the rear area in the absence of the first vehicle comprising a side facing vehicle proximity sensor, and then
    determining that the second vehicle has left the lateral side of the first vehicle responsive to detecting that the second vehicle has entered a front area of the first vehicle monitored by a second sensor of the first vehicle,
    where the detected second vehicle cannot be detected by the first sensor after the detected second vehicle has left the monitored area monitored by the first sensor and when the detected second vehicle is at the side of the first vehicle.

* * * * *